United States Patent [19]

Speck

[11] Patent Number: 4,768,569
[45] Date of Patent: Sep. 6, 1988

[54] NOTCHING MACHINE

[76] Inventor: Dwight L. Speck, 8130 Havens Corners Rd., Blacklick, Ohio 43004

[21] Appl. No.: 27,449

[22] Filed: Mar. 18, 1987

[51] Int. Cl.[4] .............................................. B27C 5/06
[52] U.S. Cl. ............................... 144/136 R; 83/475.2; 83/437; 144/3 R; 144/363; 144/371
[58] Field of Search ..................... 83/425.2, 425.3, 437, 83/477.2; 144/3 R, 136 R, 137, 371, 363

[56] References Cited

U.S. PATENT DOCUMENTS

| | | | |
|---|---|---|---|
| 3,994,326 | 11/1976 | Sarten | 83/437 |
| 4,164,882 | 8/1979 | Mericle | 83/437 |
| 4,206,672 | 6/1980 | Smith | 83/437 |

Primary Examiner—W. Donald Bray
Attorney, Agent, or Firm—Robert B. Watkins; Daniel H. Dunbar

[57] ABSTRACT

A machine for performing notches of controlled depth in cabinet component parts and the like. The machine consists in part of a main frame with a plurality of elongated support members of equal length. A plurality of tools are mounted to said main frame, consisting in part of a plurality of cutting blades which with the aid of a plurality of guides assist in making a plurality of predetermined notches. The operating sequences herein are preferable but not necessarily limited to manual control.

2 Claims, 5 Drawing Sheets

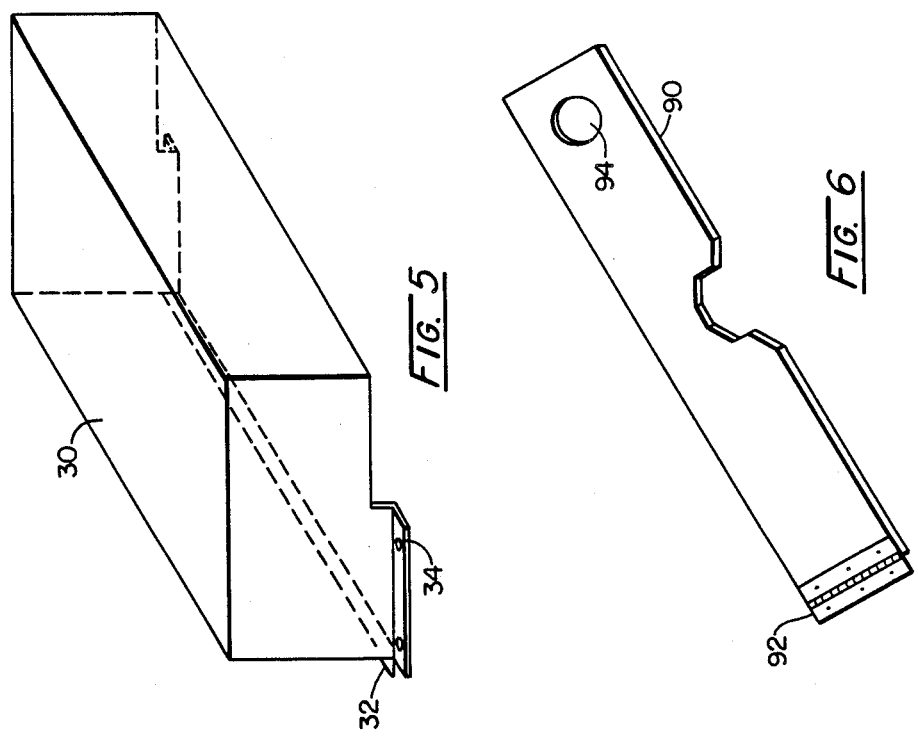
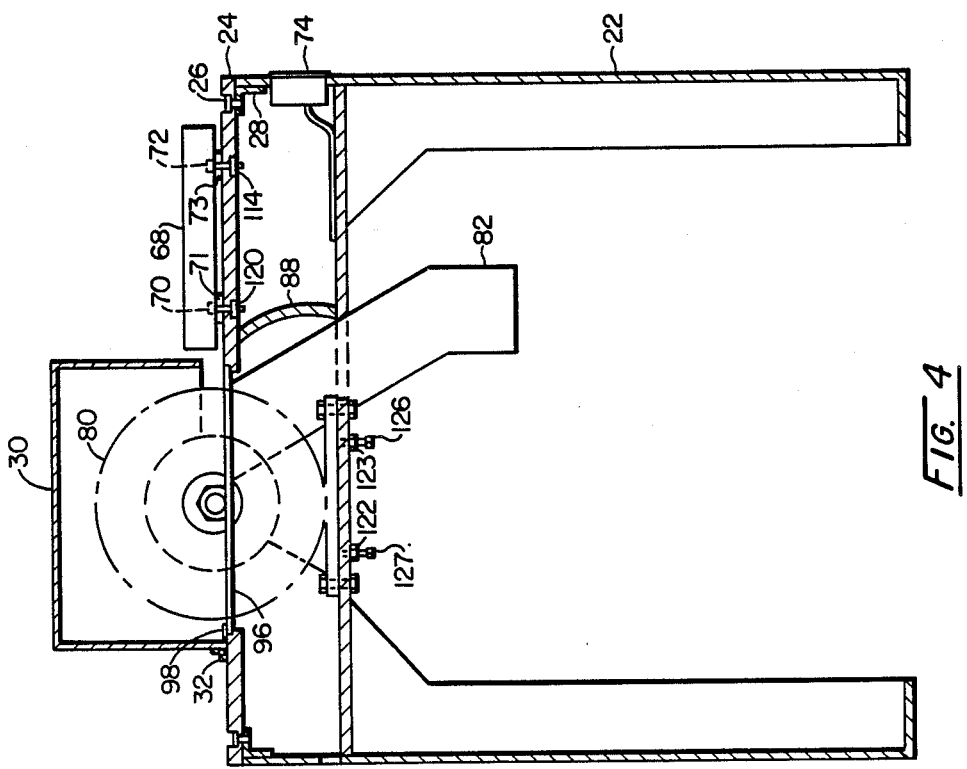

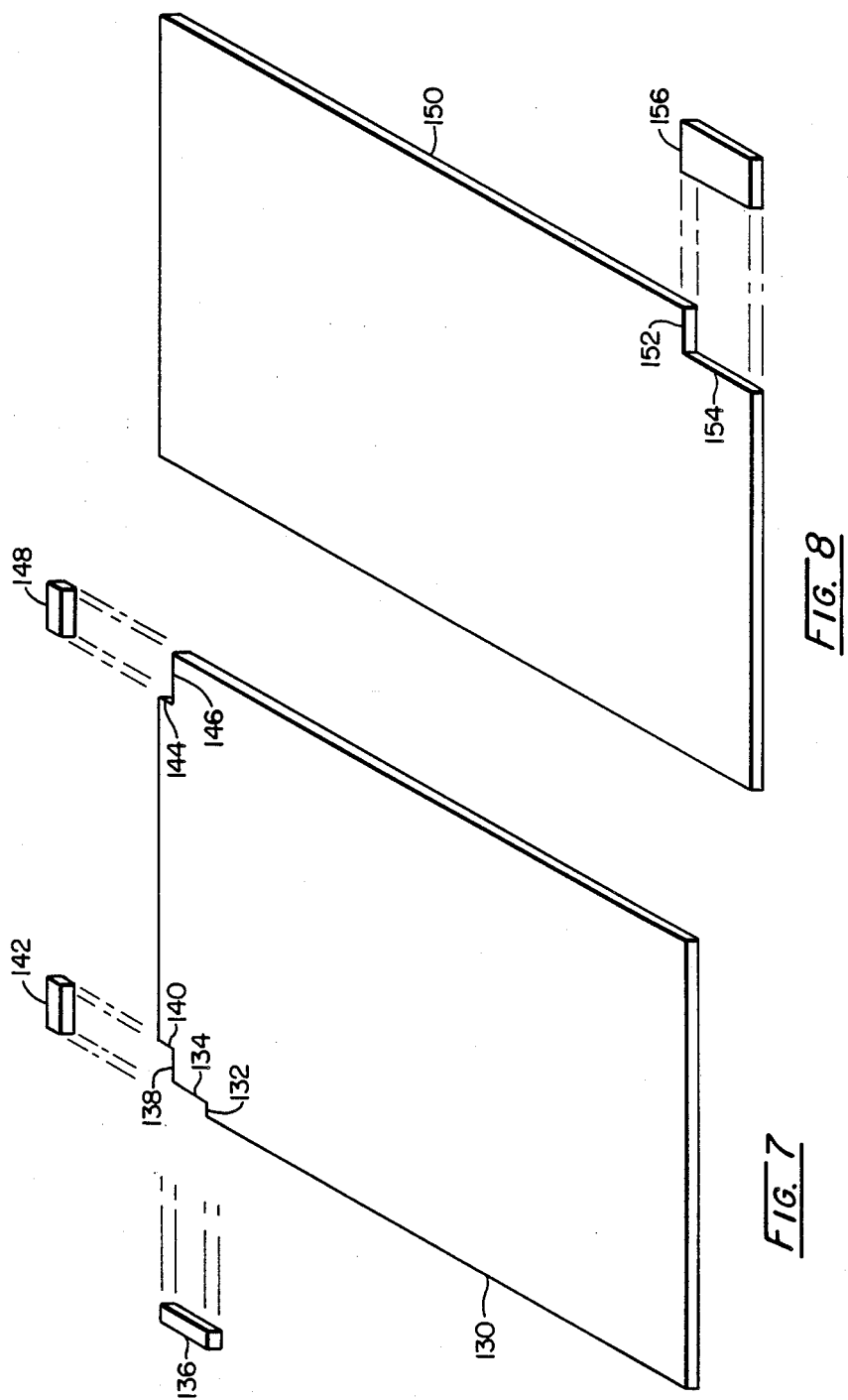

NOTCHING MACHINE

This invention relates to notching machines and more particularly to notching machines for use in the cabinet industry.

Every cabinet has, what is referred to in the arts as, a "toe-kick". A toe-kick being the recess between the cabinet bottom and the floor on which the cabinet sets.

The name toe-kick defines what this recess actually is. A recess so when a person walks up to a cabinet, their shoes will not kick the cabinet leaving mares and/or damaging the cabinet.

The toe-kick is so inconspicuous that very little attention has been focused on how to achieve it.

The toe-kick is made by making notches in the cabinet end panels. Thereby a board being attached to said notch. Said board runs horizontal the full length of the cabinet, thereby creating the toe-kick.

One purpose of this invention is to provide a means for toe-kick notching in the cabinet industry, and particularly catering, but not necessarily limited to the small to medium sizes custom cabinet shops, where precision is a prerequisite.

Artisans in the art of custom cabinet making have several methods for making toe-kicks. One such method being that the toe-kick is made separate from the cabinet. The cabinet being a box and the toe-kick attached to the cabinet box. This method is not very attractive due to structural support whereas the toe-kick is not directly part of the cabinet. Also, precision squareness tends to be very inaccurate.

Another method in making of the toe-kick notch is by use of a router. The drawback using this method is that the router bit being of a cylindrical shape, leaves a radius in the cabinet end panel making the attachment of the toe-kick board difficult. To solve this problem either the radius has to be made square or the toe-kick board has to be radius.

Yet another method of making a toe-kick notch is by use of a table saw. This procedure consists basically of three steps;

1. Cutting a kerf in the cabinet end panel up to the desired height.
2. Cutting a second kerf being made ninety degrees to that of the first kerf. (Note: the two kerfs can not meet, because the circular shape of the saw blade will cut further into the cabinet end panel than is desired.)
3. The two kerfs have to be connected for dismemberment of the toe-kick recess, this is usually accomplished with the use of hand tools.

The use of this method seems impractical, because of the time and labor involved. Yet almost every custom cabinet shop uses this method, because it insures an accurate and precise means of achieving a toe-kick.

Other areas that require notching are referred to in the art as partitions. Partitions being a vertical member that separates one cabinet compartment from another. An example of this may be where a cabinet is long enough to accommodate a drawer stack and a couple of storage spaces, and those areas being divided by said partitions.

The partition has three main notches;

1. One being a notch to receive a front rail, for means of holding the partition vertical, by said front rail being connected to cabinet end panels. This rail also provides a means for securing a counter top to the cabinet.
2. Another notch being at the rear of the partition to receive another rail for the same purpose as the forementioned front rail.
3. While another notch being at the rear of the partition whereas being a vertical notch, receives yet another rail for means of attaching said cabinet to a wall. Said rail is referred to in the arts as a "hanging rail".

The object of the present invention is to provide a means for notching sheet materials.

Another object of the present invention is to provide a means of making said notch intervene on a longitude, and latitude, line.

Still another object of the present invention is to provide a method whereas the said intervention is square and true at a ninety degree angle on all plains.

Yet another object of the present invention is to provide adjustability for obtaining a variety of notches.

Still another object of the present invention is to provide a machine with the capabilities of accelerating the method of notching cabinet component parts without sacrifice to quality.

Another object of the present invention is to provide a machine with mechanical simplicity.

Yet another object of the present invention is to provide a machine with easy access to replacement parts.

Other objects and advantages of the present invention will become apparent to those skilled in the art as further described hereinafter.

DESCRIPTION

The present invention will be more understood with reference to the following accompanying description and accompanying detailed drawings, in which:

FIG. 4 is a cross section taken along line 4—4 of FIG. 1.

FIG. 5 is a perspective view of the guard.

FIG. 6 is a perspective view of the cover plate.

FIG. 7 is a perspective view of a cabinet partition.

FIG. 8 is a perspective view of a cabinet end panel.

DESCRIPTION AND ADJUSTMENTS

Figure 1:
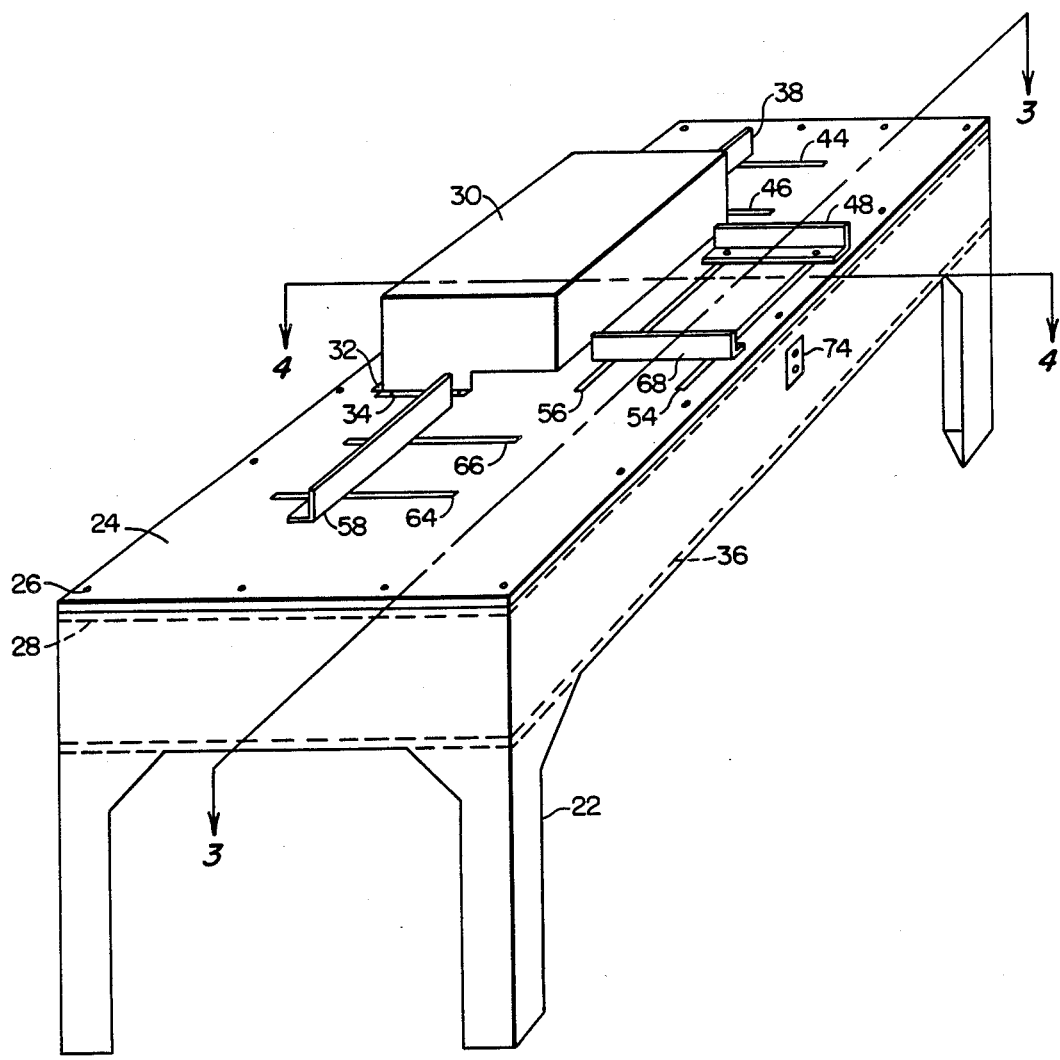
FIG. 1 is a perspective view of one embodiment of the invention.
Figure 2:
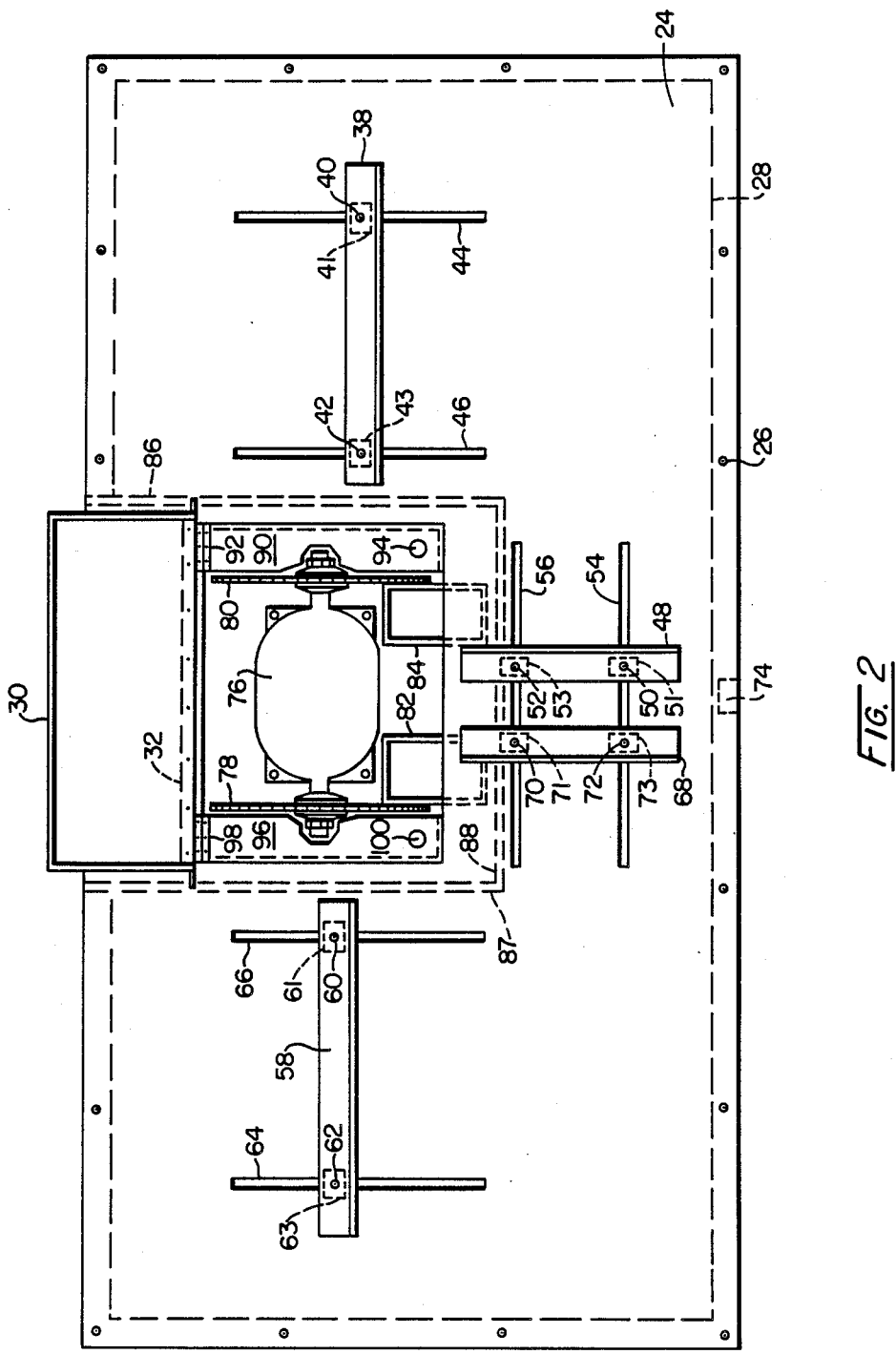
FIG. 2 is a plan view of the invention with guard reclined back.
Figure 3:
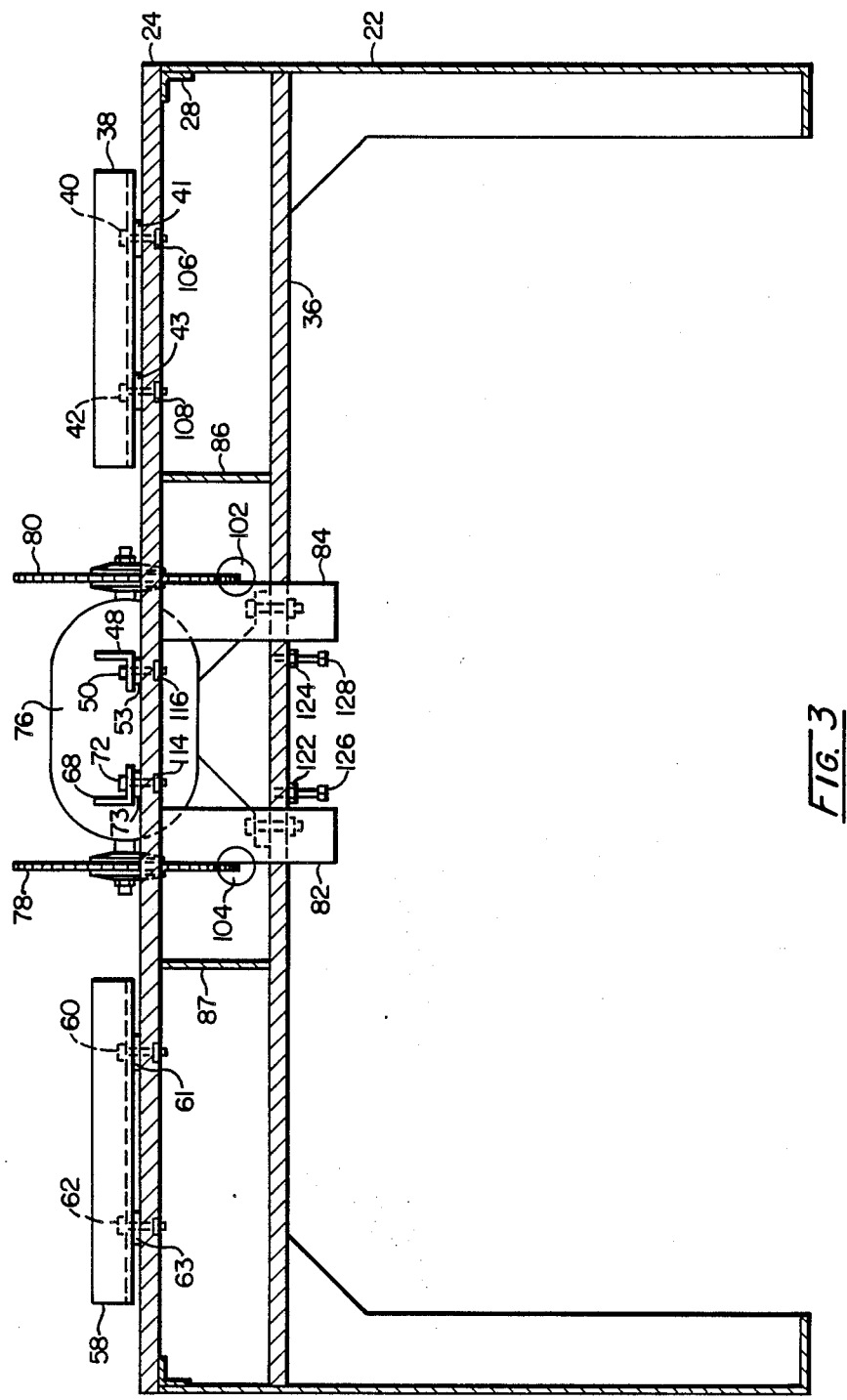
FIG. 3 is a cross section taken along line 3—3 of FIG. 1.

FIG. 1 is a perspective view illustrating the machine being supported by main frame 22 having work surface 24 secured to said main frame by bolts 26. Said bolts are threaded into tapped angle 28, thereby securing said work surface. Mounted to work surface 24 is guard 30 (FIGS. 1, 2, 4,) but best seen in FIG. 5. Said guard is secured to said work surface by the use of hinge 32 and bolts 34. Said hinge allows easy access to a plurality of tooling being located under said guard. The forementioned tooling being located under said guard is supported by intermediate support 36. Also, mounted to work surface 24 is a plurality of guides. Guide 38 being a stop guide is attached to said work surface by bolts 40 and 42 FIG. 2 (FIG. 3), thereby being secured by square nuts 106 and 108 (FIG. 3). T-slots 44 and 46 (FIG. 2) allow adjustability of the forementioned guide 38. Guide 48 being either a vertical or horizontal guide is secured to work surface 24 by the use of bolts 50 and 52. Whereas said bolts extend thru spacers 51 (FIG. 2 shown by hidden lines) and spacer 53 (FIG. 3) thereby said bolts being threaded into square nuts 116 (FIG. 3)

and 118 (not shown). Whereas said guide 48 being adjusted in T-slots 54 and 56 (FIGS. 1 and 2). Guide 58 being for the same purpose as stop guide 38, and attached in the same manner by use of bolts 60 and 62, thereby extending thru spacers 61 and 63 (FIG. 3) and threaded into square nuts 110 and 112 (FIG. 3). Whereas said guide having adjustability by use of T-slots 64 and 66 (FIGS. 1 and 2). Guide 68 being used for a vertical or horizontal cut is attached to said work surface 24 by use of bolts 70 and 72 (FIGS. 2 and 3) said bolts going thru spacers 71 and 73 (shown by hidden lines FIG. 2) and being secured by square nuts 114 and 120 (FIG. 4). Switch 74 controls drive motor 76 FIG. 3 whereas said motor having attached cutting blades 78 and 80 that cut and dismember waste material, said waste material being discharged thru chutes 82 and/or 84. Cover plates 90 and 96 have multiple uses. One being protection to the operator. Another being to contain dust within dust closures 86 and 87. Yet another purpose is to allow access to cutting blades 78 and 80 for removal and/or replacement. The forementioned cover plates 90 and 96 are secured to work surface 24 by use of hinges 92 and 98. Said cover plates being lifted by use of finger holes 94 and 100. Baffle 88 best seen in FIG. 4 is to deflect dust back to the rear vacuum port holes 102 and 104 FIG. 3. Jack screws 126, FIGS. 3 and 4, 127 (not shown) 128 and 129 (not shown) having four point vertical adjustment of drive motor 76 and thereby adjusting cutting blades 78 and 80, by loosening lock nuts 122, 123, 124 and 125 (not shown) FIGS. 3 and 4.

OPERATION

FIG. 7 shows notches required in a cabinet partition 130. Cut 132 being made by placing said partition against guide 68 (FIGS. 1, 2, and 3) and advanced into cutter 78 (FIGS. 2 and 3) Said advancement being stopped by guide 58 (FIGS. 1, 2, and 3). Said partition is next placed against guide 48 (FIGS. 1, 2, and 3) and advanced into cutter 80 (FIGS. 2 and 3) thereby making cut 134. Guide 38 (FIGS. 1, 2, and 3) stop advancement when cuts 132 and 134 enter connect, dislodging waste material 136, which is discharged thru chute 84 (FIGS. 2 and 3). Cuts 138, 140, 144 and 146 are made by the same procedure as the foregoing and waste material being discharged thru same said chute 84 (FIGS. 2 and 3).

FIG. 8 shows cabinet end panel 150 requiring a "Toe-kick" notch. Cut 152 is obtained by adjusting guides 58 and 68 (FIGS. 1, 2, and 3). After the predetermined depth cut is made the end panel is placed against guide 48 (FIGS. 1, 2, and 3) and stopped by guide 38 (FIGS. 1, 2, and 3) when cut 154 interconnects with said cut 152, it dislodges waste material 156 which is discharged thru chute 84 (FIGS. 2 and 3)

The formentioned procedures were from left to right, however chute 82 (FIGS. 2 and 3) allow right to left operation as well.

Also, note that the center of cutters 78 and 80 FIG. 3, are above work surface 24. This distance is always one half the thickness of material being cut, therefore the cutters will always be dead center to the material, resulting in a square cut on both planes.

CONCLUSION

Thus, now that the invention having been described in full, combined with use of illustrations, has been made clear and the description while containing many specificities, the reader should not construe these as limitations on the scope of the invention, but merely as exemplifications of preferred embodiments thereof. It will become immediately obvious to those skilled in the art that many other possible variations are within it's scope.

For example, skilled artisans will readily be able to change the dimensions and shapes of various embodiments.

They will also be ready to make the main frame of alternative ferrous and non-ferrous materials.

They will want to make variations on the adjustment mechanisms shown in FIG. 3, such as the jack screws being replaced by means of gears and/or linkage devices, or pneumatic and/or hydraulic lifting devices.

They will want to put conveyors and/or means of transporting the work piece on the invention.

Another thing they will want to do is fix guides FIG. 2 on one machine for toe-kick notching and place another machine next to that for the purpose of rail notching.

They will want to use the machine for notching materials other than those used in the cabinet industry.

Accordingly the reader is requested to determine the scope of the invention by the appended claims and their legal equivalents, and not by the examples which have been given.

I claim:

1. Apparatus for cutting corner notches of predetermined widths and depths in sheet materials, comprising:
   (a) table means having a planar surface (24) for supporting sheet materials
   (b) a pair of co-axial spaced-apart powered circular saw blades (78, 80) mounted with their axis of rotation substantially in the plane of said table means planar surface;
   (c) adjustable guide means (98, 68) for each said circular saw blade; and
   (d) adjustable stop means (38, 58) for each said circular saw blade, said adjustable guide means being selectively movable in directions parallel to the rotational axis of said circular saw blades to control a width/depth of a corner notch cut, and said adjustable stop means being selectively movable in directions at right angles to the rotational axis of said circular saw blades to control the other width/depth of said corner notch cut.

2. The apparatus defined by claim 1 wherein said adjustable guide means are positioned laterally within the spacing between said pair of circular saw blades, and wherein said adjustable stop means are positioned laterally within the extent of said circular saw blades.

* * * * *